United States Patent [19]

Shimada

[11] Patent Number: 5,014,137
[45] Date of Patent: May 7, 1991

[54] METHOD OF GENERATING AN IMAGE SCANNING CLOCK SIGNAL FOR AN OPTICAL SCANNING DEVICE BY SELECTING ONE OF A PLURALITY OF OUT-OF-PHASE CLOCK SIGNALS

[75] Inventor: Kazuyuki Shimada, Tokyo, Japan

[73] Assignee: Ricoh Company, Ltd., Tokyo, Japan

[21] Appl. No.: 813,059

[22] Filed: Dec. 24, 1985

[30] Foreign Application Priority Data

Dec. 25, 1984 [JP] Japan ................................. 59-278338
Dec. 25, 1984 [JP] Japan ................................. 59-278341

[51] Int. Cl.$^5$ ............................................. A04M 1/36
[52] U.S. Cl. ................................... 358/410; 358/474; 358/494; 358/296
[58] Field of Search ............... 358/302, 296, 298, 285, 358/293, 294, 296; 388/410, 474, 494

[56] References Cited

U.S. PATENT DOCUMENTS 4,677,292  6/1987  Shimada .............................. 358/293

FOREIGN PATENT DOCUMENTS

| 51-89346 | 5/1976 | Japan . |
| 6568 | 1/1981 | Japan .................................. 358/265 |
| 6569 | 1/1981 | Japan .................................. 358/265 |
| 56-126378 | 1/1982 | Japan . |
| 66262 | 4/1984 | Japan .................................. 358/296 |
| 180373 | 9/1985 | Japan .................................. 358/296 |

*Primary Examiner*—Edward L. Coles, Sr.
*Attorney, Agent, or Firm*—Cooper & Dunham

[57] ABSTRACT

A scanning region of a surface is scanned with a beam cyclically deflected with a rotating light deflector. The beam is detected by a light sensor which generates a synchronizing signal. A plurality of clock signals are generated which have the same frequency as that of an image scanning clock signal to be produced but which are out of phase with each other. One of these clock signals is selected as the image scanning clock signal. The selection process is a function of the synchronizing signal.

3 Claims, 8 Drawing Sheets

F I G. 17

METHOD OF GENERATING AN IMAGE SCANNING CLOCK SIGNAL FOR AN OPTICAL SCANNING DEVICE BY SELECTING ONE OF A PLURALITY OF OUT-OF-PHASE CLOCK SIGNALS

BACKGROUND OF THE INVENTION

The present invention relates to a method of generating an image scanning clock signal in an optical scanning device.

There have been known optical scanning devices in which a light beam is cyclically deflected as a scanning beam that scans a given information storage surface to read information therefrom or write information thereon.

Some of such optical scanning devices employ a rotating light deflector as a means for cyclically deflecting the light beam.

The rotating light deflector comprises a rotating polygonal mirror or a hologram disc composed of a holographic diffraction grating, which is rotated to deflecting the light beam. Where the light beam is deflected by the rotating light deflector, the repetitive light beam deflection does not occur in a uniformly periodic pattern because of manufacturing errors of the rotating polygonal mirror or the hologram disc or mechanical errors arising from mechanical rotation of the rotating light deflector.

Starting points of a scanning region, i.e., positions where respective scanning cycles are started, should be aligned with each other on the surface which is scanned by the scanning beam. If such starting positions were not aligned accurately, then an image written on the surface would be distorted by jitter, or an image reconstructed from read-out signals would be distorted by jitter.

One way of aligning the scanning starting positions is to position a light sensor outside of the scanning region, detect the scanning beam moving toward the scanning region each time the scanning beam is deflected, thereby generating a synchronizing signal, count clock pulses of an image scanning clock signal up to a prescribed number by using the synchronizing signal as a reference signal, and effecting a light scanning cycle after the clock pulses have been counted up to the prescribed number. Therefore, when the synchronizing signal is generated, the image scanning clock pulses are counted up to m clock pulses, and the scanning cycle is started at the time the (m+1)th clock pulse is reached.

Since the image scanning clock pulses are successively produced, the sychronizing signal would be generated at different times with respect to the image scanning clock signal if the synchronizing signal were produced irregularly due to an error of the rotating light deflector. It is assumed that an image scanning clock pulse is counted when the image scanning clock signal changes from the "low" state to the "high" state. If the synchronizing signal is generated immediately before the image scanning clock signal changes from the low state to the high state, then one clock pulse is counted when the image scanning clock signal goes high. If the synchronizing signal is generated immediately after the image scanning clock signal changes from the low state to the high state, then first one clock pulse is counted when the image scanning clock signal changes from the next low state to the high state. Therefore, the image scanning starting points can be varied to an interval which is equal to at most one image scanning clock pulse.

The image scanning clock signal is used as a reference for optical scanning of the information storage surface, and the width of one clock pulse is equal to the width of one pixel of the image to be read or written by the scanning light beam. With the above process of aligning the scanning starting points, therefore, the scanning starting points are subject to a variation up to one pixel width, and the image which is written or read out suffers a corresponding amount of jitter. Jitter-induced image distortion would be considerably noticeable if it were equal to the width of one-half pixel or more, with the result that the reproduced image would be much less appealing aesthetically to the eye.

Methods of reducing variations of the light scanning starting points are disclosed in Japanese Kokais 51-89346 and 56-126378. The method disclosed in the former publication requires a reference clock signal having a frequency n times higher than that of the image scanning clock signal in order to suppress variations of the light scanning starting points down to an interval of 1/n pixel or smaller. As the extent to which starting point variations can be reduced is proportional to the frequency of the reference clock signal used, this method is disadvantageous in that its ability to reduce the starting point variations is limited by the reference clock signal frequency that can be achieved.

The method disclosed in the latter publication is affected by the allowable operation error of a delay element used. In order to attain a desired degree of reduction of the starting point variations, such a delay element error has to be reduced to a certain range, an effort which results in a high cost.

SUMMARY OF THE INVENTION

It is therefore an object of the present invention to provide a method of generating an image scanning clock signal which can be achieved inexpensively and easily while easily and reliably reducing variations of scanning starting points.

An image scanning clock signal has a frequency which is indicated by f, and a plurality of clock signals each having the frequency f are generated out of phase with each other. Changeover between the "high" state and the "low" state of each of these clock signals will be referred to as a "state changeover". The plural clock signals are designed so as to be successively generated with a certain phase difference.

On its way toward a scanning region, a scanning beam is detected by a light sensor, which then generates a synchronizing signal.

One of the plural clock signals which is in a certain relationship to the synchronizing signal can be selected as the image scanning clock signal. For example, the clock signal which has an mth state changeover after the synchronizing signal has been generated may be selected as the image scanning clock signal.

The phase difference between the successively generated clock signals is designed to be constant. Assuming that the phase difference is actually constant, the limit of variations of the scanning starting points is rendered constant irrespectively of the value of m when the clock signal having the mth state changeover after the synchronizing signal has been generated is selected. This limit of variations of the scanning starting points will be referred to as a theoretical limit.

Although the phase difference between the successively generated clock signals is designed to be constant, it is not actually constant due to errors arising from various causes. In view of these errors, the actual limit of variations of the scanning starting points is naturally greater than the theoretical limit.

According to the present invention, there are two approaches to the reduction of variations of the scanning starting points in the presence of the various errors to which the phase difference between the clock signals is subjected.

One approach is to reduce the errors of the phase difference between the successively produced clock signals, and will be referred to as a first method. The other approach, referred to as a second method, is to reduce accumulated phase difference errors when one of the plural clock signals is selected as the image scanning clock signal.

The first method is accomplished in the following manner: A reference signal having the same frequency f of the image scanning clock signal is generated by a reference clock generator. Corrective clock signals having a frequency Nf (N is a natural number of at least 2) are generated by a corrective clock generator. The reference clock signal and the corrective clock signals are applied to shift registers to enable them to produce a plurality of clock signals which are out of phase with each other and have the frequency f. These plural clock signals are applied to a latch circuit, which latches the clock signals in response to an applied synchronizing signal and issues signals corresponding to the latched clock signals. The output signals from the latch circuit and the clock signals from the shift registers are applied to a clock selector, which selects one of the clock signals as the image scanning clock signal according to an arithmetic operation on the output signals from the latch circuit. With the plural clock signals being successively generated by the shift registers, the phase difference errors between these clock signals are reduced to quite a small degree, and the actual limit of variations of the scanning starting points is also reduced. The theoretical limit in this case is equal to the width of $\frac{1}{2}$N pixel.

The second method is accomplished as follows: Three or more clock signals having the same frequency as that of the image scanning clock signal are generated successively out of phase, and one of the clock signals which has a state changeover immediately before or after the synchronizing signal is generated is selected as the image scanning clock signal. This process can prevent phase difference errors from being accumulated.

The first and second methods can be carried out either independently or simultaneously. If effected simultaneously, the errors themselves can be reduced and also prevented from being accumulated. As a consequence, the actual limit of variations of the scanning starting points can effectively be brought closely to the theoretical limit.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Generation of a plurality of clock signals and selection of one of the plural clock signals as an image scanning clock signal will first be described briefly.

Figure 1:
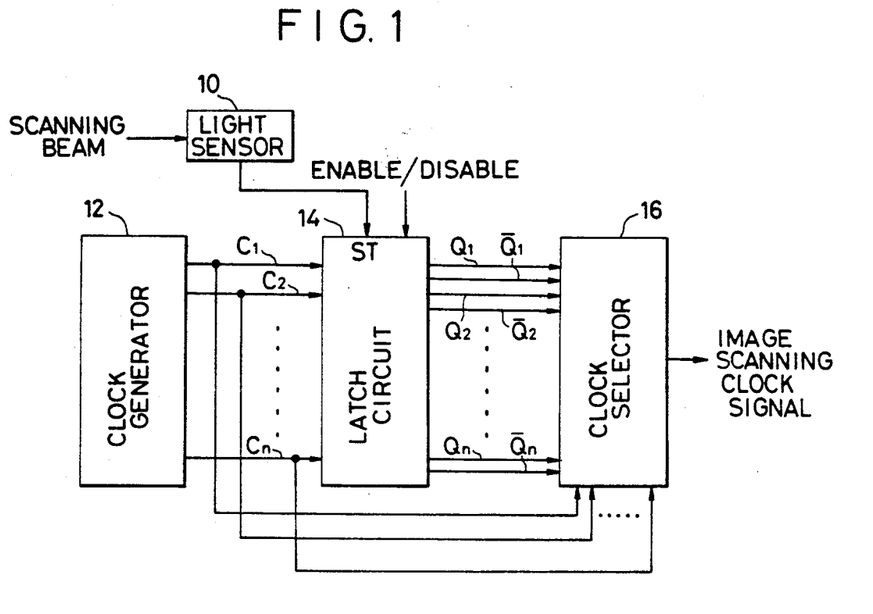
FIG. 1 is a block diagram of a circuit for carrying out the invention.

As shown in FIG. 1, a light sensor 10 is positioned outside of a scanning region closely to scanning starting points for detecting a scanning beam prior to each scanning cycle (primary or main scanning cycle). The output signal from the light sensor 10 is applied as a synchronizing signal to a latch circuit 14.

A clock generator 12 produces three or more pulse signals as clock signals which have the same frequency as an image scanning clock signal to be generated and are successively out of phase. The number of the clock signals is indicated as n ($n \leq 3$)

Figure 2:
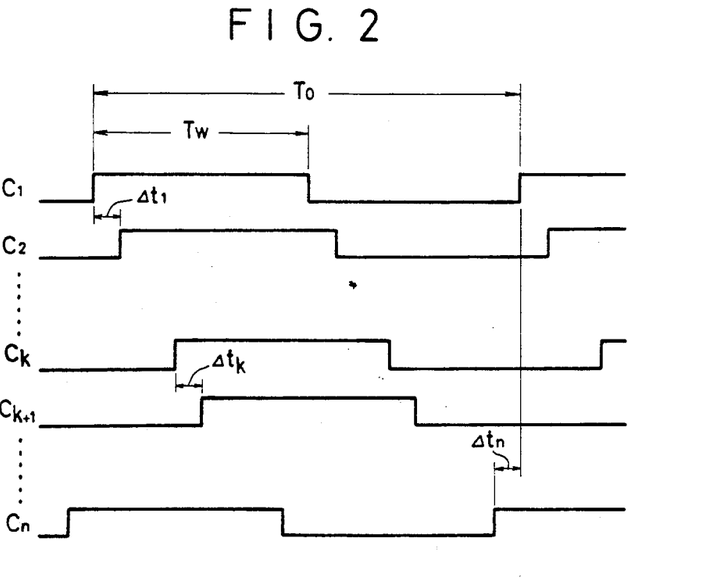
FIG. 2 is a diagram showing n clock signals generated by a clock generator.

FIG. 2 shows the relationship between these n clock signals $C_1, C_2, \ldots, C_k, C_{k+1}, \ldots, C_n$. Each of the clock signals has a period $T_0$ and a pulse width or duration $T_W$. Denoted at $t_k$ is the phase difference between the kth (k = 1 through n) clock signal and the (k+1)th clock signal. When k=n, $C_{k+1} = C_{N+1}$. In this case, $C_{n+1}$ is considered as $C_1$. The period $T_0$ is expressed by $$T_0 = \sum_{k=1}^{n} \Delta t_k$$

The clock generator 12 may comprise a combination of a reference clock generator and a delay element, or a combination of a reference clock generator and a shift register.

In response to the leading edge of the synchronizing signal from the light sensor 10, the latch circuit 14 latches the clock signals $C_k$ (k=1 through n) from the clock generator 12 and issues output signals $Q_1$ through $Q_n$ and $\overline{Q}_1$ through $\overline{Q}_n$. If the latched clock signals $C_k$ are high, the output signals $Q_k, \overline{Q}_k$ (k=1 through n) are logic 1 and logic 0, respectively, and if the latched clock signals $C_k$ are low, the output signals $Q_k, \overline{Q}_k$ are logic 0 and logic 1, respectively. Thus, the output signals $Q_k, \overline{Q}_k$ are in inverted relationship to each other.

The latch circuit 14 is also responsive to an ENABLE/DISABLE signal to control the output signals $Q_k$ for causing a clock selector 16 to inhibit the generation of an image scanning clock signal. At this time, the image scanning clock signal has a steady "low" or "high" state.

The clock selector 16 is supplied with the output signals $Q_1$ through $Q_n$, $\overline{Q}_1$ through $\overline{Q}_n$ and the clock signals $C_1$ through $C_n$. The clock selector 16 is responsive to the output signals $Q_1$ through $Q_n$, $\overline{Q}_l$ through $\overline{Q}_n$ for selecting out of the clock signals $C_1$ through $C_n$ as an image scanning clock signal.

More specifically, the clock selector 16 calculates $Q_k \cdot \overline{Q}_{HD}$ $k+1$ ($k=1$ through n, when $k=n$, $C_{k+1}=C+1$) or $\overline{Q}_k \cdot Q_{k+1}$ ($k=1$ through n, when $k=n$, $C_{k+1}=C_{n+1}$) from which it can be known between which clock signals the synchronizing signal is generated. Based on this information, the clock selector 16 selects one of the clock signals which has a certain relationship to the generation of the synchronizing signal as the image scanning clock signal. If the selected clock signal is unstable at this time, its waveform is shaped into a stable image scanning clock signal.

One example in which $n=6$ will be reviewed below.

Figure 3:
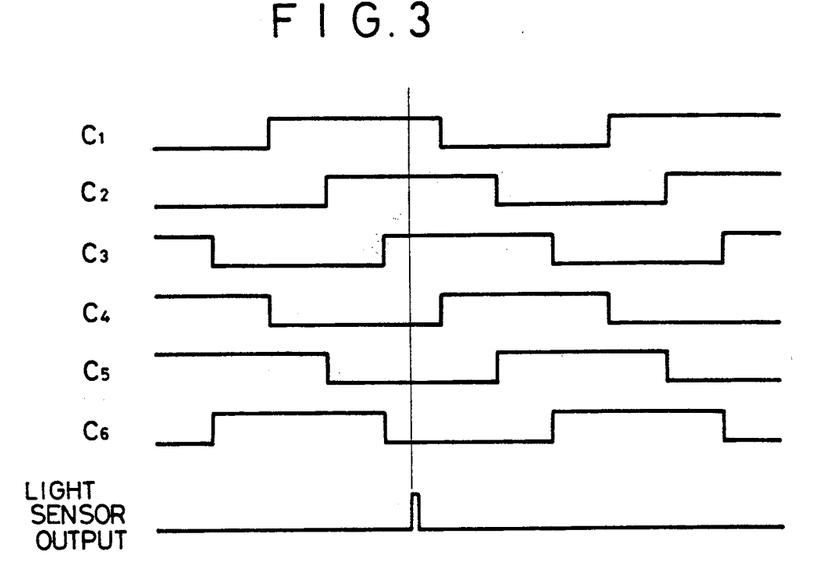
FIGS. 3 through 6 are diagrams explanating the manner in which one of six clock signals is selected as an image scanning clock signal.

If the synchronizing signal is generated by the light sensor 10 as shown in FIG. 3, the clock signals $C_1$ through $C_6$ latched by the leading edge of the synchronizing signal are high, high, high, low, low, and low, respectively. The states of the output signals $Q_1$ through $Q_6$, $\overline{Q}_1$ through $\overline{Q}_6$, and $Q_k \cdot \overline{Q}_{k+1}$ are as follows:

| k | $Q_k$ | $\overline{Q}_k$ | $Q_k \cdot \overline{Q}_{k+1}$ |
|---|-------|------------------|--------------------------------|
| 1 | 1     | 0                | 0                              |
| 2 | 1     | 0                | 0                              |
| 3 | 1     | 0                | 1                              |
| 4 | 0     | 1                | 0                              |
| 5 | 0     | 1                | 0                              |
| 6 | 0     | 1                | 0                              |

This table indicates that the value of $Q_k \cdot \overline{Q}_{k+1}$ is 1 only when $k=3$. This means that the synchronizing signal is generated immediately after the clock signal $C_4$ goes high, this condition corresponding to the status of FIG. 3.

A clock signal which is in a prescribed relationship to the synchronizing signal is selected as the image scanning clock signal. The prescribed relationship is defined, for example, such that the clock signal which has a third positive-going edge, among other clock signals, after the synchronizing signal is selected as the image scanning clock signal. The clock signal which meets this relationship is the clock signal $C_6$ in FIG. 3.

Figure 4:
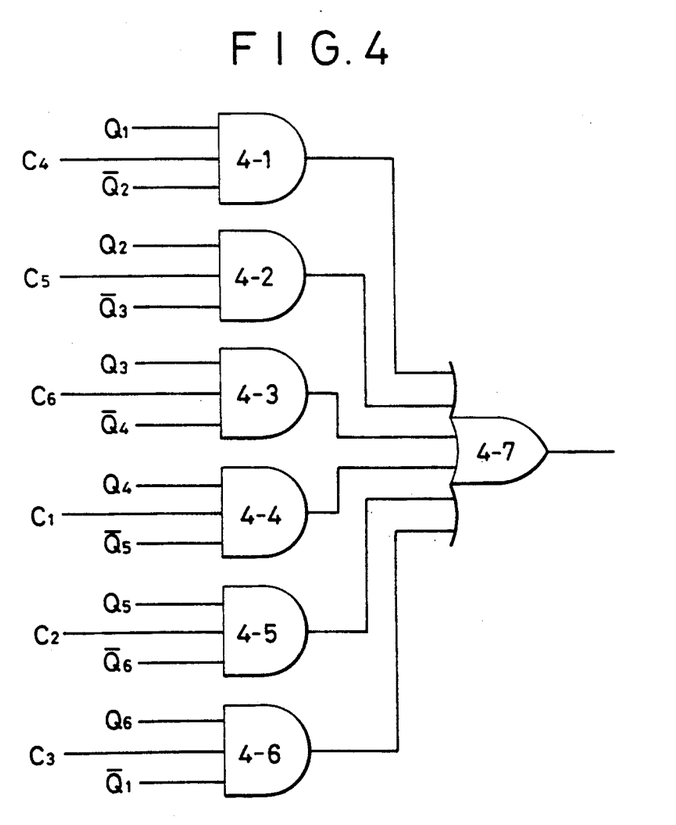

In order to select the clock signal which meets the above relationship, the clock selector 16 comprises AND gates 4-1 through 4-6 and an OR gate 4-7, as shown in FIG. 4, the AND gates being supplied with the signals as illustrated.

As described above, the delay element or shift register is employed in the clock generator for producing the n clock signals $C_1$ through $C_n$. Actually, however, the phase differences $\Delta t_k$ ($k=1$ through n) between the produced n clock signals are not constant, and their magnitudes are scattered along an error curve.

If the phase differences were completely constant and $\Delta t_\kappa$ ($k=1$ through n)$=T_0/n$, then variations of the scanning starting points would be the 1/n pixel interval or less irrespectively of the clock signal selected in relation to the synchronizing signal. That is, if the clock signal having the mth positive-going edge from the time the synchronizing signal was generated were selected, variations of the scanning starting points would be the 1/n pixel interval or less, and would not be dependent on the value of m.

In reality, $\Delta t_k$ is not constant, however. Although the variations of the phase differences $\Delta t_k$ between n clock signals produced by using the shift register are considerably smaller than by using the delay element, the phase differences $\Delta t_k$ still exist.

If the clock signal having the mth positive-going edge after the synchronizing signal is selected and the synchronizing signal is produced between $k=1$ and $k=i+1$, then variations of the scanning starting points of the selected clock signal are proportional to:

$$\sum_{k=i+1}^{m} \delta_k + \Delta t_i$$

where $\delta_k$ is an error of $\Delta t_k$, expressed by $\Delta t_k - (T_0/n)$.

According to the present invention, the clock signal immediately before or after the synchronizing signal is generated is selected. With this arrangement, since the first term $\Sigma \delta_k$ of the above formula is zero, the phase difference error is effectively prevented from being accumulated upon selection of the clock signal, and variations of the scanning starting points can be reduced.

The clock signal immediately before or after the synchronizing signal is generated means a clock signal which has its positive-going edge (or negative-going edge) immediately before or after the synchronizing signal is generated if the synchronizing signal is specified in relation to the positive-going edge (or negative-going edge) of the clock signal.

Figure 5:
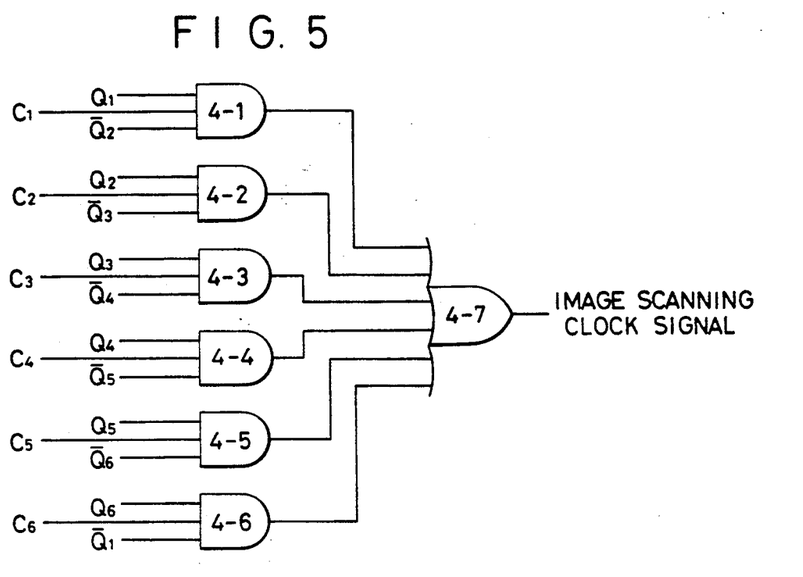

For example, if the clock signal is to be selected immediately before the synchronizing signal is produced in the above example, then the input signals to be applied to the AND gates 4-1 through 4-6 shown in FIG. 4 should be changed to those shown in FIG. 5. If the clock signal is to be selected immediately after the synchronizing signal is produced, then $C_1$ should be changed to $C_2$, $C_2$ to $C_3$, $C_3$ to $C_4$, $C_4$ to $C_5$, $C_5$ to $C_6$, and $C_6$ to $C_1$.

Figure 7:
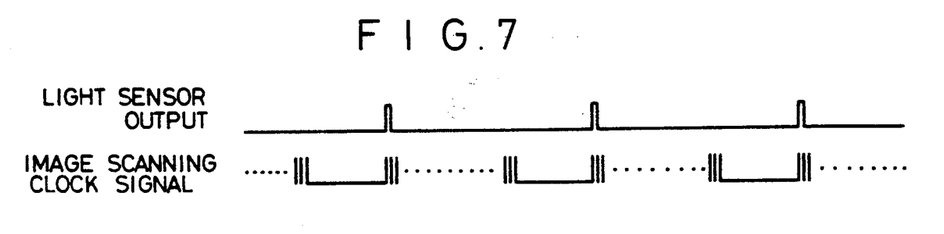
FIGS. 7 through 11 are diagrams additionally explanatory of the embodiment described with reference to FIG. 1.

FIG. 7 shows the manner in which after the synchronizing signal has been generated by the light sensor 10, a certain number of image scanning clock pulses are produced, and then such image scanning clock pulses are not generated (a stable "low" or "high" state) until the next synchronizing signal is generated by the light sensor. In FIG. 7, the stable low state exists while no image scanning clock pulses are generated.

Figure 6:
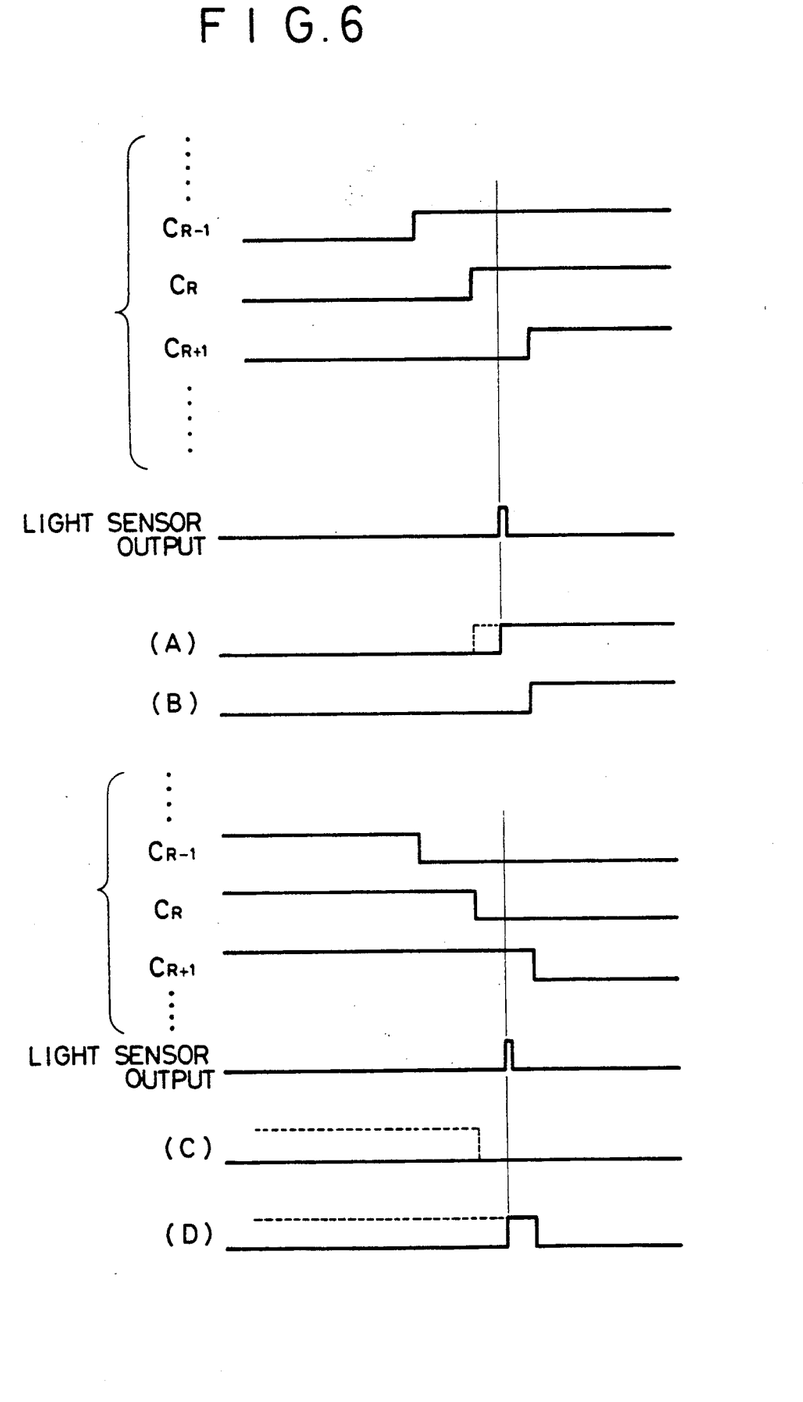

FIG. 6 illustrates the manner in which the image scanning clock signal is selected from the plural clock signals $C_k$ that are latched in response to the synchronizing signal from the light sensor. FIG. 6 shows at (A) the selection of a clock signal $C_R$ having its positive-going edge immediately before the synchronizing signal is generated, and FIG. 6 shows at (B) the selection of a clock signal $C_{R+1}$ having its positive-going edge immediately after the synchronizing signal is generated. FIG. 6 shows at (C) the selection of the clock signal $C_R$ having its negative-going edge immediately before the synchronizing signal is generated, and FIG. 6 shows at (D) the selection of the clock signal $C_{R+1}$ having its negative-going edge immediately after the synchronizing signal is generated. Although each of the clock signals shown in FIG. 6 at (A), (B), (C), and (D) has its low stable state, it may have a high stable state.

If the selected image scanning clock signal is unstable, it may be stabilized by a waveform shaping circuit.

Figure 8:
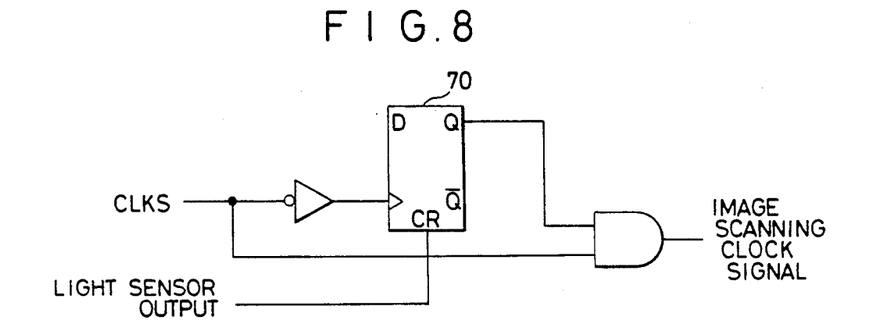
Figure 9:
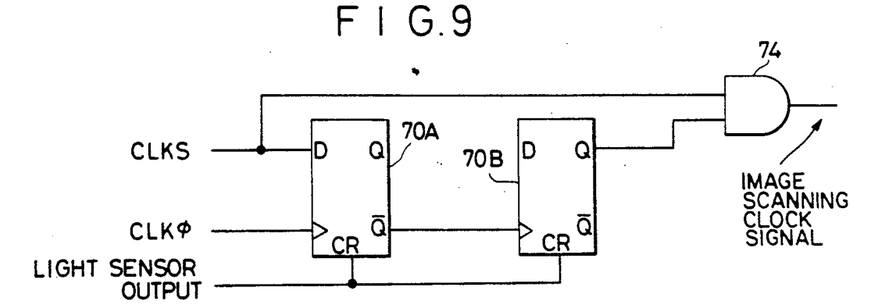

FIGS. 8 and 9 show waveform shaping circuits for stably issuing the image scanning clock signal shown in FIG. 6(A) when its stable state is low (see FIG. 7). Designated in FIGS. 8 and 9 at 70, 70A, 70B are D-type flip-flops, CLKS the image scanning clock signal from the clock selector, and CLK$\phi$ a clock signal having a frequency higher than that of the image scanning clock signal.

Figure 10:
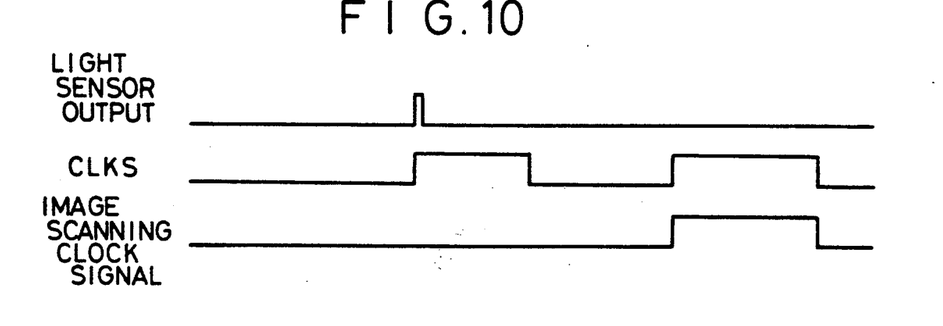
Figure 11:
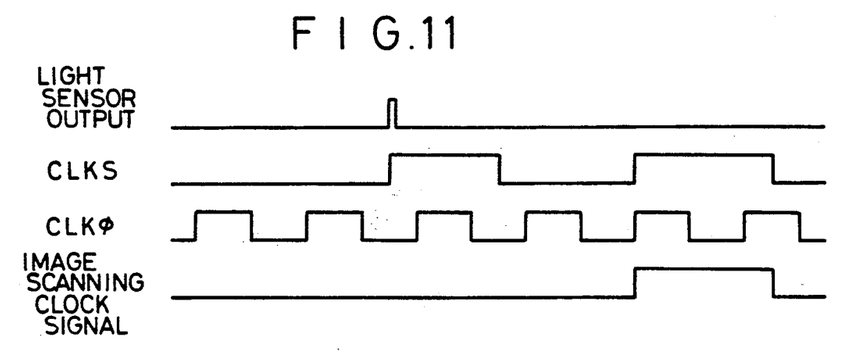

FIG. 10 is a timing chart of the signals in the waveform shaping circuit of FIG. 8, and FIG. 11 is a timing chart of the signals in the waveform shaping circuit of FIG. 9.

Figure 12:
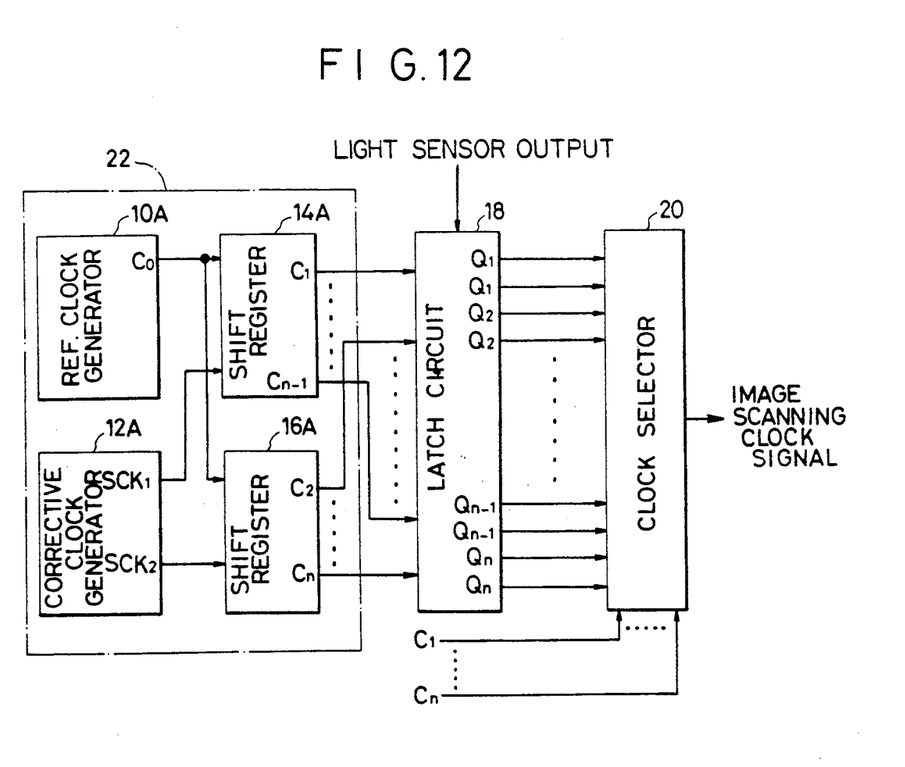
FIG. 12 is a block diagram of another circuit for carrying out the present invention.

FIG. 12 illustrates another circuit arrangement for generating a plurality of clock signals with shift registers. The illustrated circuit includes a circuit 22 for generating a plurality of clock signals, the circuit 22 corresponding to the clock generator 12 shown in FIG. 1.

A reference clock signal $C_0$ having a frequency f equal to that of an image scanning clock signal is generated by a reference clock generator 10A. Two corrective clock signals $SCK_1$, $SCK_2$ (FIG. 13) having a frequency which is N (N is a natural number of at least 2) times higher than the frequency f of the reference clock signal $C_0$ are generated by a corrective clock generator 12A. In the illustrated embodiment, the two corrective clock signals $SCK_1$, $SCK_2$ are of the same frequency and 180° out of phase with each other.

The reference clock signal $C_0$ is applied to shift registers 14A, 16A. The corrective clock signals $SCK_1$, $SCK_2$ are impressed respectively to the shift registers 14A, 16A.

Figure 13:
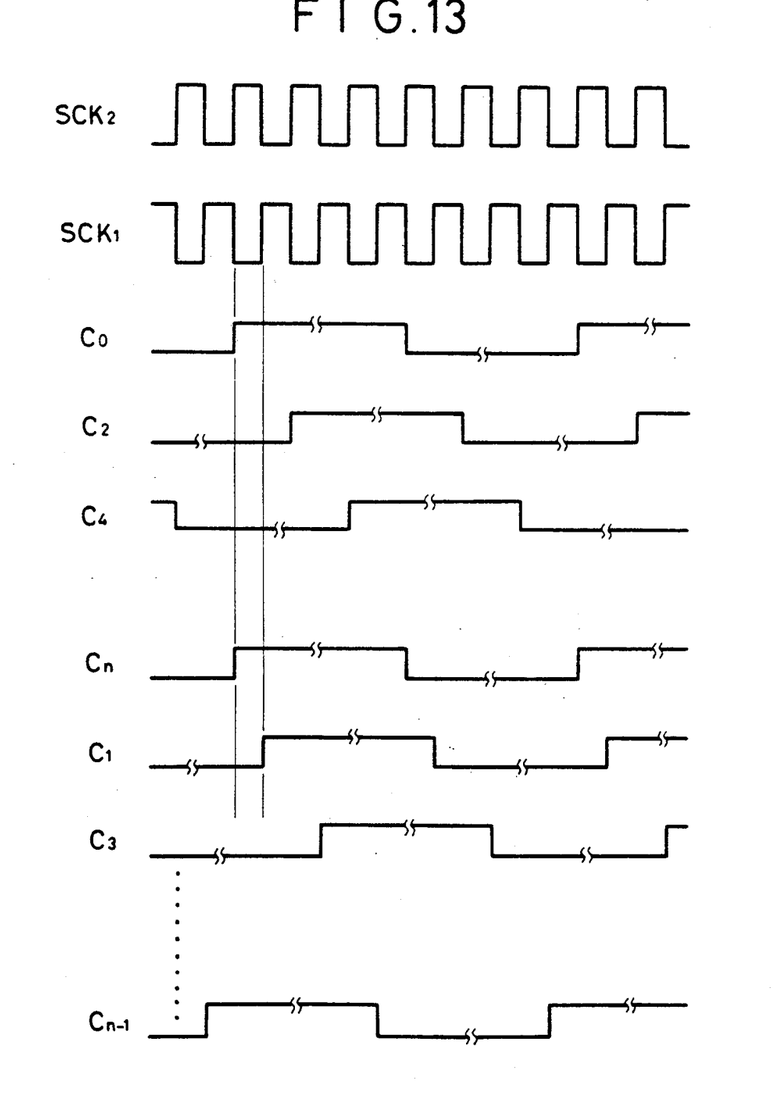
FIGS. 13 and 14 are diagrams additionally explanatory of the embodiment described with reference to FIG. 12.

As shown in FIG. 13, the shift register 14A is responsive to the reference clock signal $C_0$ and the corrective clock signal $SCK_1$ for generating clock signals $C_1$, $C_3$, $C_5$, ..., $C_{n-1}$ which have the frequency f and are out of phase by one periodic interval of the corrective clock signal $SCK_1$. The shift register 16A is responsive to the reference clock signal $C_0$ and the corrective clock signal $SCK_2$ for generating clock signals $C_2$, $C_4$, ..., $C_n$ which have the frequency f and are out of phase by one periodic interval of the corrective clock signal $SCK_2$. The number n is an even number in the illustrated embodiment. Where n is an odd number, the clock signals $C_1$, $C_3$, ..., $C_n$ are produced by the shift register 14A, and the clock signals $C_2$, $C_4$, ..., $C_{n-1}$ are produced by the shift register 16A.

Therefore, the n clock signals $C_1$, $C_2$, ..., $C_n$ are generated by the shift registers 14A, 16A. These n clock signals $C_1$, $C_2$, ..., $C_n$ are as shown in FIG. 2. Provided any errors in the timing at which the shift registers 14A, 16A generate the n clock signals are neglected, the phase differences $\Delta t_k$ (k=1 through n) are equal to each other and also to the pulse duration of the corrective clock signals $SCK_1$, $SCK_2$. Where the plural clock signals $C_1$ through $C_n$ are generated by the shift registers, errors of the phase differences $\Delta t_k$ can be reduced to a much smaller degree than where the delay element is employed. Since the phase differences $\Delta t_k$ are equal to the pulse duration of the corrective clock signals which have the frequency N times higher than that of the reference clock signal, $\Delta t_k = T_0/2N$ if the errors are neglected. These clock signals $C_1$ through $C_n$ are applied to a latch circuit 18 and also to a clock selector 20.

The latch circuit 18 and the clock selector 20 are identical to the latch circuit 14 and the clock selector 16, respectively, shown in FIG. 1.

The image scanning clock signal is selected in relation to the generation of the synchronizing signal in the same manner as described above. For example, by employing the clock selector shown in FIG. 4, the clock signal having the third positive-going edge after the synchronizing signal is selected as the image scanning clock signal. Where the clock selector shown in FIG. 5 is used, the clock signal having its positive-going edge immediately before the synchronizing signal is selected as the image scanning clock signal.

Figure 14:
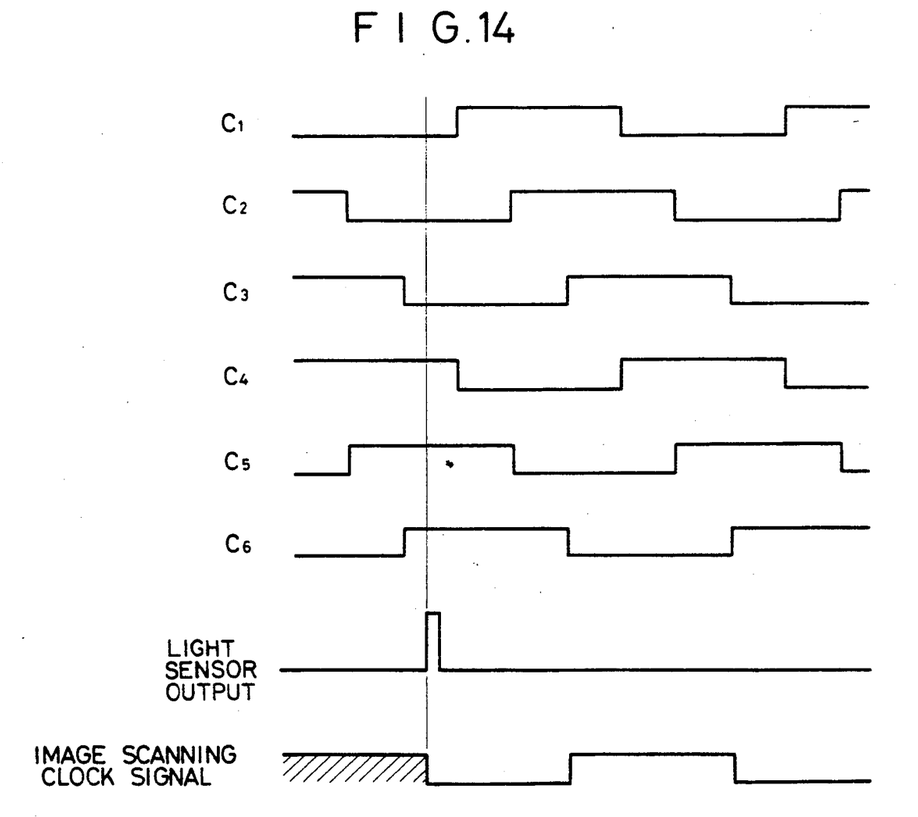

One example in which the clock selector of FIG. 5 is used and n=6 is shown in FIG. 14. As illustrated in FIG. 14, the image scanning clock signal is uncertain in state before the synchronizing signal is generated. If the image scanning signal is to be stopped after a certain number of clock pulses are issued after the image scanning clock signal has been selected by the synchronizing signal and then the line has been scanned, the image scanning clock signal remains constant immediately before it is selected.

When there is no error in the timing at which the shift registers 14A, 16A generate the n clock signals, the theoretical limit of variation in the scanning starting point is less than 1/n of a pixel if one of the n clock signals $C_1$ to $C_n$ is selected. When the clock signals $C_1$ to $C_n$ are generated according to the corrective signals $SCK_1$ and $SCK_2$, the period of the corrective signals is equal to the phase difference ($2T_0/n$ between the clock signals $C_i$ and $C_{i+1}$, as shown in FIG. 13. Therefore, the frequency of the corrective signals is $n/2T_0) = (nf)/2$. Since the clock signals $C_1$ to $C_n$ are generated according to the corrective signals having the frequency (nf)/2, the corrective signals should maintain that frequency (nf/2 in order to keep the variation of the scanning starting point to less than 1/n of a pixel.

Figure 15:
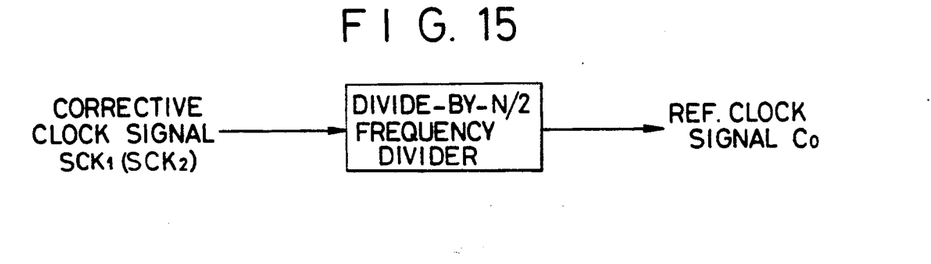
FIG. 15 is a block diagram of a reference clock generator.

Inasmuch as the errors of the phase differences $\Delta t_k$ are quite small when the plural clock signals are generated by the shift registers, any accumulated errors are not so large even when the mth (m≧2) clock signal is selected after the synchronizing signal has been generated. Influence due to the errors can be minimized by selecting the clock signal immediately before or after the synchronizing signal is produced.

Where the n clock signals are generated by the shift registers, the frequency of the corrective clock signals is n/2 times higher than that of the image scanning clock signal. For producing N clock signals, therefore, the reference clock signal $C_0$ can be obtained by frequency-dividing the corrective clock signal $SCK_1$ or $SCK_2$ into a signal having a 1/(N/2) frequency with a divide-by-N/2 frequency divider as shown in FIG. 15. Stated otherwise, the reference clock generator may comprise the corrective clock generator and the divide-by-N/2 frequency divider (N is an even number). The ratio of phase differences between even-numbered and odd-numbered clock signals of the N clock signals $C_1$ through $C_N$ is the same as the ratio of pulse durations of the corrective clock signals, $SCK_1$, $SCK_2$. Variations of the scanning starting points are equal to at most the greater pulse duration of the corrective clock signals $SCK_1$, $SCK_2$.

Figure 16:
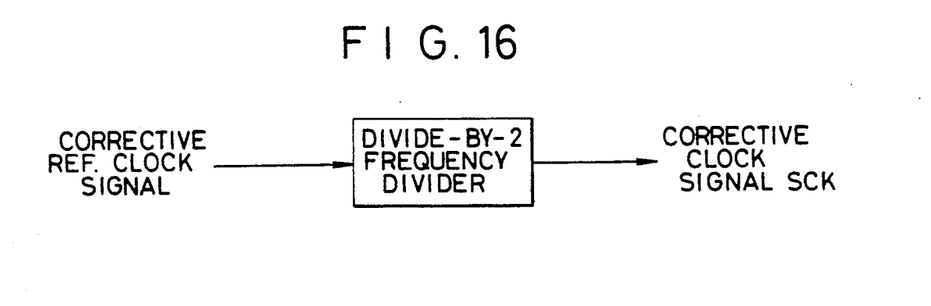
FIG. 16 is a block diagram of a corrective clock generator.
Figure 17:
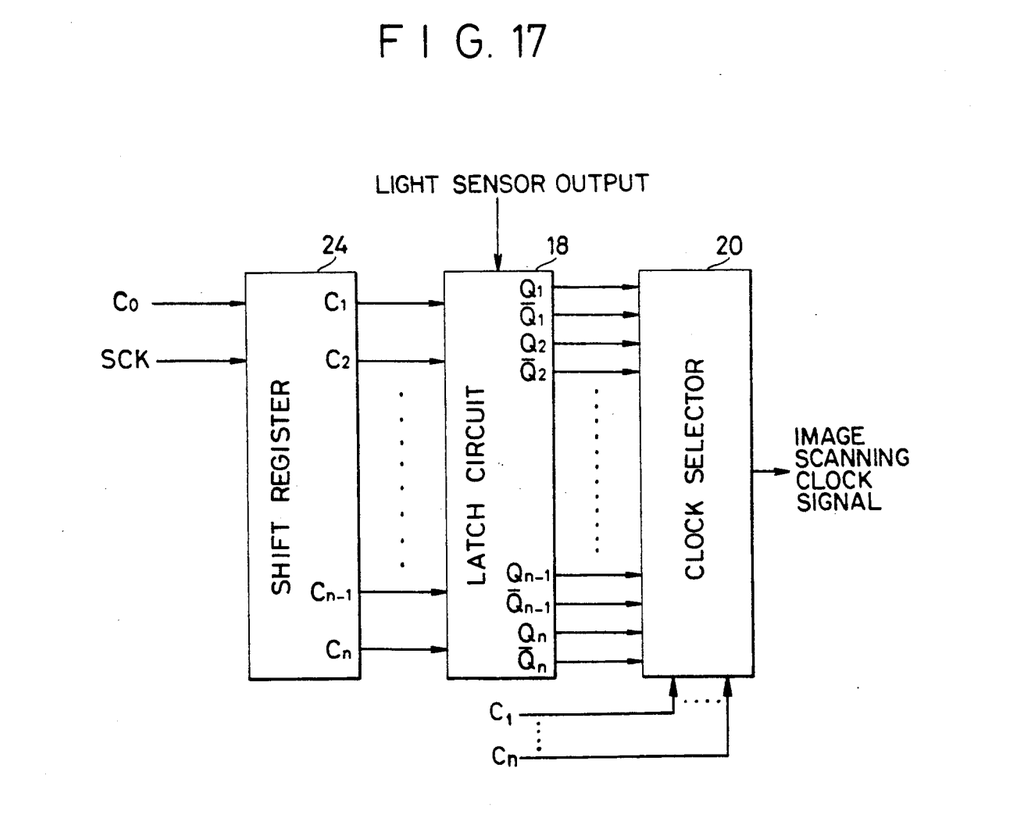
FIG. 17 is a block diagram of still another circuit for carrying out the present invention.

To equalize the pulse durations of the corrective clock signals $SCK_1$, $SCK_2$, a corrective reference clock signal having a frequency twice that of a clock signal SCK ($=SCK_1=SCK_2$) may be frequency-divided into a ½ frequency with a divided-by-two frequency divider as shown in FIG. 16, so that the corrective clock signal SCK can be obtained. With this arrangement, the clock signals $C_1, C_2, \ldots, C_n$ can be produced by applying the reference clock signal $C_0$ and the corrective clock signal to a single shift register 24 as shown in FIG. 17.

The entire circuit arrangement for carrying out the methods of the invention can be of a digital construction in the form of a digital gate array, and hence can be manufactured at relatively low cost.

Although certain preferred embodiments have been shown and described, it should be understood that many changes and modifications may be made therein without departing from the scope of the appended claims.

What is claimed is:

1. A method of generating an image scanning clock signal in an optical scanning device in which a scanning region of a given surface is scanned with a light beam cyclically deflected by a rotating light deflector, and the light beam is detected by a light sensor which is located outside of the scanning region and which generates a synchronizing signal upon detection of the light beam, said method comprising the steps of:

generating a reference clock signal having a frequency f equal to that of the image scanning clock signal with a reference clock generator, and corrective clock signals having a frequency Nf (N is a natural number of at least 2) with a corrective clock generator;

applying said reference clock signal and said corrective clock signals to shift registers to enable the shift registers to generate a plurality of out-of-phase clock signals having said frequency f;

applying said plurality of clock signals from said shift registers to a latch circuit to latch the clock signals therein in response to the synchronizing signal from said light sensor for enabling the latch circuit to output signals corresponding to the respective latched clock signals; applying the latched clock signals from said latch circuit and the clock signals from said shift registers to a clock selector; and effecting an arithmetic operation on said latched clock signals from said latch circuit to output one of said clock signals from said shift registers as the image scanning clock signal from said clock selector.

2. A method according to claim 1, wherein said one clock signal output as the image scanning clock signal from said clock selector is a clock signal which has a negative- or positive-going edge immediately before or after said synchronizing signal is generated.

3. A method according to claim 1, wherein said reference clock generator comprises a combination of said corrective clock generator and a frequency divider.

* * * * *